(12) United States Patent
Stevenson et al.

(10) Patent No.: US 6,338,190 B1
(45) Date of Patent: Jan. 15, 2002

(54) METHOD FOR AUTOMATICALLY SETTING AN AIR GAP

(75) Inventors: Robin Stevenson, Bloomfield; Thaddeus Schroeder, Rochester Hills, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/576,002

(22) Filed: May 22, 2000

Related U.S. Application Data

(62) Division of application No. 09/186,560, filed on Nov. 5, 1998, now Pat. No. 6,176,636.

(51) Int. Cl.$^7$ .................................................. B23P 11/00
(52) U.S. Cl. ......................................... 29/434; 29/468
(58) Field of Search ............................. 403/13, 14, 104, 403/105, 106, 110, 404; 74/102; 324/173; 29/434, 468, 525.11, 525.12

(56) References Cited

U.S. PATENT DOCUMENTS

| | | | |
|---|---|---|---|
| 3,865,095 A | 2/1975 | Helmick | 403/104 X |
| 4,469,466 A | 9/1984 | Hotz | 403/388 |
| 5,295,405 A | 3/1994 | Gumbert et al. | 74/102 X |
| 5,613,290 A | * 3/1997 | Alfors | 29/434 |
| 5,951,191 A | 9/1999 | Schroeder et al. | 403/13 |
| 6,070,865 A | * 6/2000 | Schroeder et al. | |
| 6,123,301 A | * 9/2000 | Schroeder et al. | |
| 6,139,211 A | * 10/2000 | Schroeder et al. | |

OTHER PUBLICATIONS

Schroder et al, "Side–Mount Bracket System for Providing a Locked Sensor Position," USSN 09/361,839 filed Jul. 27, 1999.

* cited by examiner

*Primary Examiner*—David P. Bryant
(74) *Attorney, Agent, or Firm*—Margaret A. Dobrowitsky

(57) ABSTRACT

A two-component bracket and drive washer combination which provides secure holding of a magnetic sensor while automatically setting an optimal air gap, wherein operation is very quick, easy and reliable and wherein the air gap setting is precisely repeated each time a magnetic sensor is replaced or re-installed. A main bracket component has an aperture and a drive wall at one end of the aperture. A sensor body is connected to the main bracket component and is allowed to touch a reluctor. A reaction bracket has a reaction wall in the aperture opposite the drive wall and is restrained from moving. A drive washer is provided with teeth having a pitch whereby as the washer is pressed between the drive and reaction walls along a transverse axis, the main bracket component is forced to move along a longitudinal axis, thereby moving the sensor body in relation to the reluctor an amount precisely equal to a desired air gap.

1 Claim, 4 Drawing Sheets

METHOD FOR AUTOMATICALLY SETTING AN AIR GAP

This appln is Divisional of Ser. No. 09/186,560 filed Nov. 5, 1998 U.S. Pat. No. 6,176,636.

TECHNICAL FIELD

The present invention relates to brackets for holding a first object with respect to a second object. More particularly, the present invention relates to a bracket for precisely locating a sensor relative to an object to be sensed. Still more particularly, the present invention relates to a two-component bracket and drive washer combination, wherein facial interaction between the two-component bracket and the drive washer as they are brought together along a transverse axis results in one component of the two-component bracket moving a precisely predetermined distance relative to the center of the drive washer along a longitudinal axis normal to the transverse axis, thereby automatically setting an air gap.

BACKGROUND OF THE INVENTION

Magnetic sensors operate on the principle of detecting magnetic flux density modulation caused by the movement of appropriately configured reluctors (or targets). The magnetic sensor must be affixed very close to the reluctor since its sensitivity decreases very rapidly with the size of the air gap between the reluctor and the magnetic sensor. In most automotive applications, for example, the air gaps are on the order of 0.3 to 1.75 mm. Over such a range of air gaps, the sensor output signal decreases more than ten times. The signal attenuation at large air gaps makes the sensor operation more prone to noise induced failures as well as less accurate in detecting the elements of the reluctor as it spins in relation to the magnetic sensor. Both of these factors are often unacceptable in critical engine control and diagnostic applications.

It may at first glance appear that there would be no problem whatsoever to choose and achieve an appropriate air gap between the magnetic sensor and the reluctor. However, in the majority of production cases, the stack-up of tolerances of the many different components randomly influence the net size of the air gap, which consequently precludes achieving, at each assembly, a precisely predetermined air gap by mere assembly of the parts. As a result, because of the random variations caused by accumulation of tolerances, mere assembly of the parts risks damaging interference between the magnetic sensor and reluctor on the one hand, and inaccurate readings associated with too large an air gap on the other hand. To lessen all the tolerances so that mere assembly assures, at each assembly, the optimum air gap is physically unrealistic and involves inordinate costs associated with manufacturing such precise parts.

The majority of magnetic sensors used in automotive applications involve non-adjustable air gap placement, wherein the stack-up of tolerances causes deviation from the optimal air gap. For example, a rigid bracket is affixed to the body of a magnetic sensor. The magnetic sensor is placed into a sensor port in the engine block, and the bracket is bolted, via a bolt hole in the bracket, to a threaded mounting hole in a mounting surface of the engine block. When the bracket is bolted the length of the sensor body from the bolt hole of the bracket to the sensor tip determines the air gap with respect to the reluctor, which air gap is affected by the stack-up of tolerances. Even though subject to tolerance related placement inaccuracy, this structural mounting methodology is used widely because of the simplicity of the hardware, and ease of assembly and service.

In situations where air gap variation cannot be tolerated, the air gap is preset during magnetic sensor installation by means of an adjustable bracket, often referred to as a "side mount" bracket. The adjustability of side mount brackets resides in a bolt slot which allows for the bracket to be adjusted along the slot elongation relative to the threaded mounting hole of the mounting surface.

In one form of operation of side mount bracket, the sensor body is placed into the sensor port of the engine block such that the sensor tip is allowed to touch the surface of the reluctor, and then it is withdrawn a distance equal to the predetermined optimum air gap. This method is more time consuming and is error prone.

In another form of operation of side mount bracket, a sacrificial layer of soft abradable material is placed onto the sensor tip, wherein the thickness of the sacrificial layer is equal to the optimum air gap. Now, the installer need merely place the sensor body into the sensor port until the sensor tip touches the reluctor, and then tighten the bolt on the mounting surface with the sensor body retained at this position. During initial rotation of the reluctor, the sacrificial layer may abrade due to reluctor runout or differential thermal expansion without damage being incurred to the sensor body or the reluctor. The sacrificial layer may be either attached to the sensor body or be a part thereof, such as a protuberance, provided the sensor body is of a soft material. However, in the event the magnetic sensor must be re-installed, the abraded sacrificial layer will not be able to again provide position location as it was able to do when unabraded. Therefore, before dismounting the magnetic sensor, the bracket must be marked to indicate the correct position of the sensor body relative to the bracket so that when the new magnetic sensor is re-installed its position on the bracket can be sighted—not an exact procedure. In any event, should the sacrificial layer be exposed to a lubricating oil, the oil spray may carry the abraded debris into oil passageways.

In the prior art, it is known to precisely adjust the air gap using a threaded sensor body and threaded sensor port. This structure is generally used exclusively with magnetic sensors having a single sensing element and having sensing capability unaffected by sensor rotation around its longitudinal axis. In this approach, the sensor tip is brought into touching engagement with the reluctor, and then the sensor body is rotated a predetermined angular amount, wherein the pitch angle of the threads raises the tip a distance equal to the optimum air gap. However, most automotive magnetic sensors contain more than one sensing element and are designed to operate at only one particular angular setting around the sensor axis. Consequently, a threaded sensor body would need to be adjusted in whole revolution steps (ie., 360 degrees) and air gap adjustment would then be in steps of the thread pitch. While the use of a sufficiently small pitch may render the air gap setting resolution adequate, many sensors are precluded from rotation due to geometrical interferences.

Accordingly, what is needed in the art is a structure for holding a magnetic sensor which allows easy and quick re-installation and removal of the magnetic sensor, and provides for automatic setting of an optimal air gap.

SUMMARY OF THE INVENTION

The present invention is a two-component bracket and drive washer combination which provides secure holding of a magnetic sensor while automatically setting an optimal air gap, wherein operation is very quick, easy and reliable and wherein the air gap setting is precisely repeated each time a magnetic sensor is replaced or re-installed.

A two-component bracket is provided in the form of a main bracket component and a reaction bracket component, wherein the reaction bracket component is located in side-by-side relation to the main bracket component and interconnected therewith so as to be slidable in relation thereto along a longitudinal axis. The main bracket component is provided with a relatively large aperture, wherein a drive wall of the main bracket component is located on one side thereof. The reaction bracket component has a reaction wall located in the aperture opposite the drive wall. The drive and reaction walls at the aperture mutually result in a collective opening elongated along the longitudinal axis.

The drive washer is knurled, wherein the knurling of the sidewall thereof provides a plurality of teeth having a predetermined pitch angle, while the drive and reaction walls are smooth. The teeth of the sidewall may be provided in any suitable form, such as for example splines, serrations, cutting ridges or cutting surfaces arranged along the pitch angle. A slight draft (ie., conical shape) of the drive washer is preferred to facilitate initial insertion of the drive washer into the collective opening with respect to abutment with the drive and reaction walls. In this regard, the drive washer has an initial bracket engagement surface and the draft commences at said initial bracket engagement surface.

The drive washer and spacing between the drive and reaction walls are dimensioned so that when the drive washer is inserted into the collective opening, the drive and reaction walls tightly abut the teeth of the drive washer. Since the drive washer teeth are hard in relation to the drive and reaction walls, the teeth inscribe corresponding grooves into the smooth drive and reaction walls as the drive washer is pressed into the collective opening along a transverse axis. In this regard, it is preferred for the reaction wall to be harder than the drive wall.

The reaction bracket component has an affixment hole generally centrally positioned with respect to the aperture and is secured to a non-movable article, such as for example a mounting surface, via a bolt passing through the affixment hole and threading into a threaded bore at the mounting surface. The drive washer has a central hole through which the bolt also passes.

Both the main bracket component and the reaction bracket component are restrained from rotating about the bolt, but the drive washer is freely rotatable about the bolt. The main bracket component is freely movable along the longitudinal axis, but is restrained from moving along the transverse axis. The reaction bracket component is restrained from moving along both the longitudinal and transverse axes.

As the bolt is tightened, the drive washer teeth engage the smooth drive and reaction walls, whereupon corresponding grooves are inscribed thereinto. In this regard, as the drive washer moves into the collective opening, the drive washer rotates on the bolt in response to the pitch of the teeth as the teeth cut into the reaction wall. Further in this regard, the drive wall is caused to move along the pitch of the teeth and further to move in response to the rotation of the drive washer.

In operation with respect to installation of an automotive magnetic sensor with respect to a reluctor, the magnetic sensor is affixed to the main bracket component. An installer places the sensor body of the magnetic sensor into the sensor port of the engine block such that the sensor tip touches the surface of the reluctor. The bolt carrying the drive washer is loosely threaded into a threaded bore at the mounting surface until the sidewall of the drive washer touches the drive and reaction walls. The installer continues to thread the bolt into the threaded bore, thereby causing the drive washer to be pressed into the collective opening along the transverse axis. As the drive washer penetrates into the collective opening, the toothed sidewalls inscribe the smooth drive and reaction walls, resulting in the drive washer sliding parallel to and along the teeth at each of the drive and reaction walls. In this regard, the tooth and groove interaction at the reaction wall results in a rotation of the drive washer on the bolt since the reaction bracket cannot move.

Accordingly, as the drive washer moves into the collective opening along the transverse axis, the main bracket component is caused to move along the longitudinal axis relative to the bolt based upon firstly the tooth to groove interaction at the drive wall and secondly based upon the rotation of the drive washer. This duality of interaction of the drive washer at the drive wall results in the main bracket component moving along the longitudinal axis at twice the rate as would be provided by the pitch angle alone. The distance of relative movement along the longitudinal axis is given by: $2*(D*\tan(A))=G$, wherein D is the depth of penetration of the drive washer into the collective opening along the transverse axis, A is the pitch angle of the teeth, and G is the distance of movement of the main bracket component along the longitudinal axis and is equal to the desired optimum air gap.

Now, should the magnetic sensor require servicing, it can be removed and re-installed, or a new magnetic sensor can be installed in its place, using the installation procedure outlined above. In each case, the optimum air gap will be precisely achieved automatically. In the case of re-installation, the original installation will have resulted in the drive washer and two-component bracket becoming lodged together so as to resist mutual separation. Consequently, the magnetic sensor can be re-installed using the lodged drive washer and two-component bracket combination and yet the same air gap will pertain because the original relative position between the mounting bolt and the two-component bracket will be maintained.

Accordingly, it is an object of the present invention to provide a structure for holding one object relative to a second object, wherein a preset distance of separation with respect to a third object is automatically set.

It is a further object of the present invention to provide a two-component bracket and drive washer combination wherein the facial interaction between opposing walls of first and second bracket components with the sidewall of the drive washer provides a predetermined movement of one of the first and second bracket components along a longitudinal axis in response to pressing of the drive washer between the opposing walls along a transverse axis.

It is yet an additional object of the present invention to provide a drive washer and two-component bracket combination for precisely locating a magnetic sensor relative to a reluctor, wherein the air gap therebetween is automatically set independent of stack-up of parts tolerances.

These, and additional objects, advantages, features and benefits of the present invention will become apparent from the following specification.

DESCRIPTION OF THE PREFERRED EMBODIMENT

Figure 1:
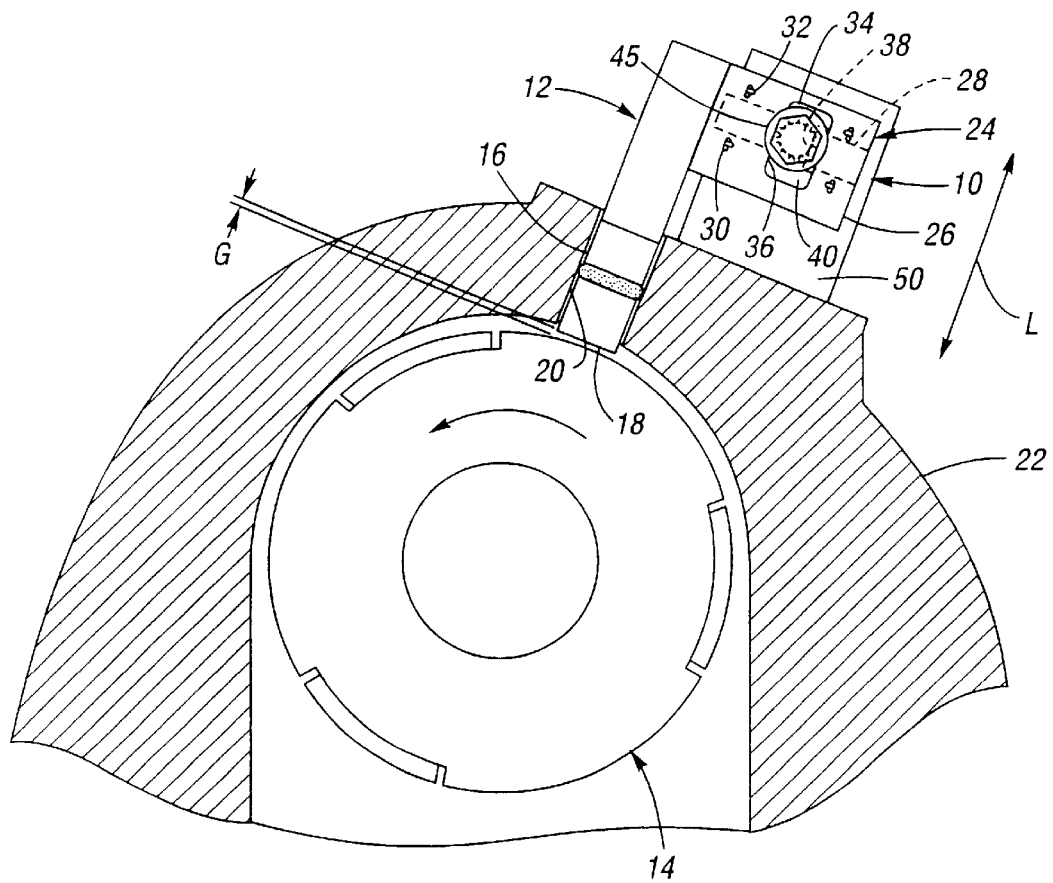
FIG. 1 is a partly sectional side view of a first form of the two-component bracket and drive washer combination according to the present invention, shown in a typical environment of operation wherein a magnetic sensor is spaced from a reluctor a distance equal to an optimum air gap.
Figure 2:
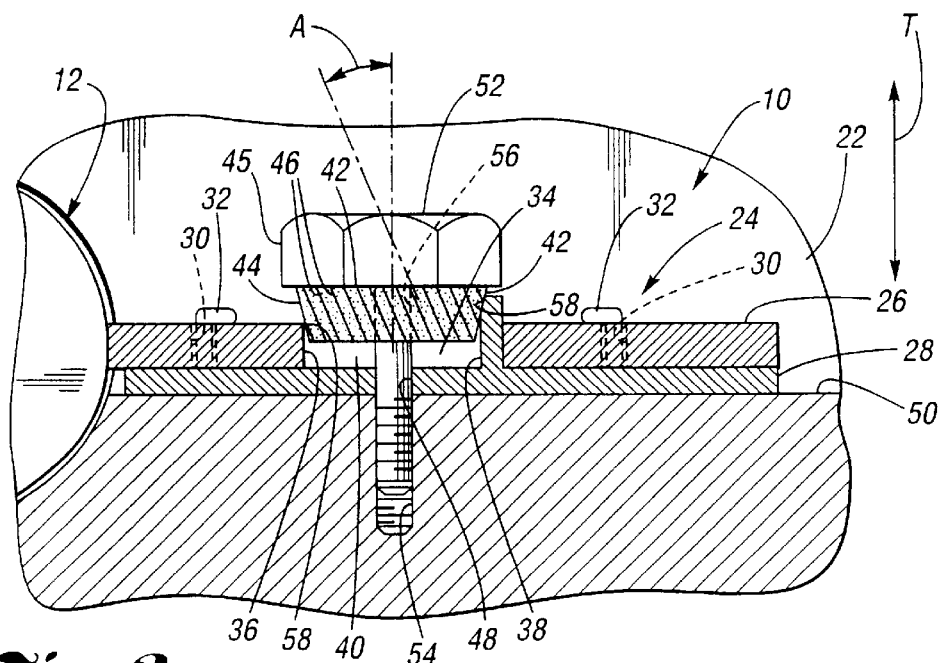
FIG. 2 is a partly sectional side view of the first form of the two-component bracket and drive washer combination according to the present invention, shown in operation.
Figure 3:
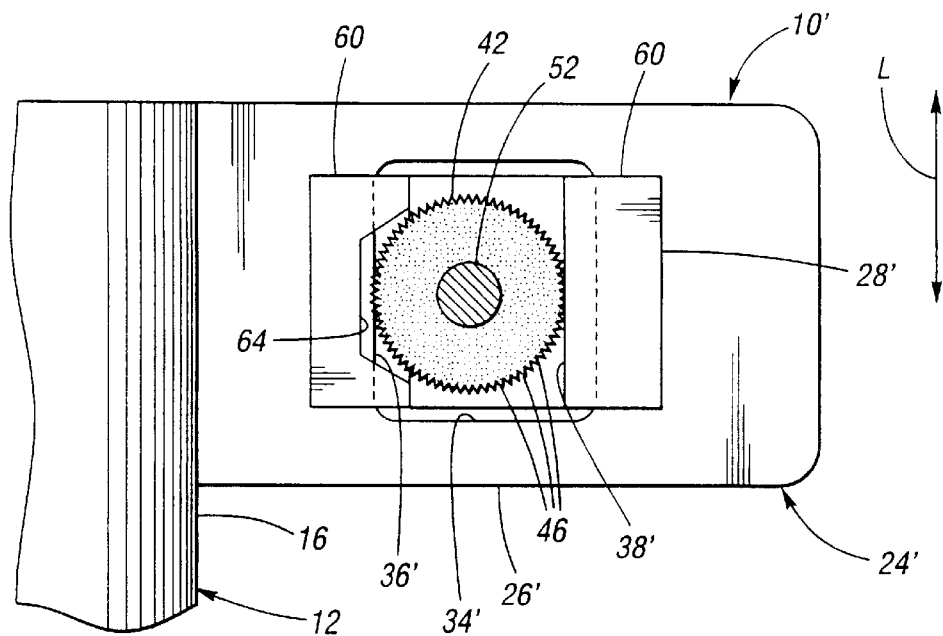
FIG. 3 is a partly sectional top plan view of a second form of the two-component bracket and drive washer combination, shown in operation.
Figure 4:
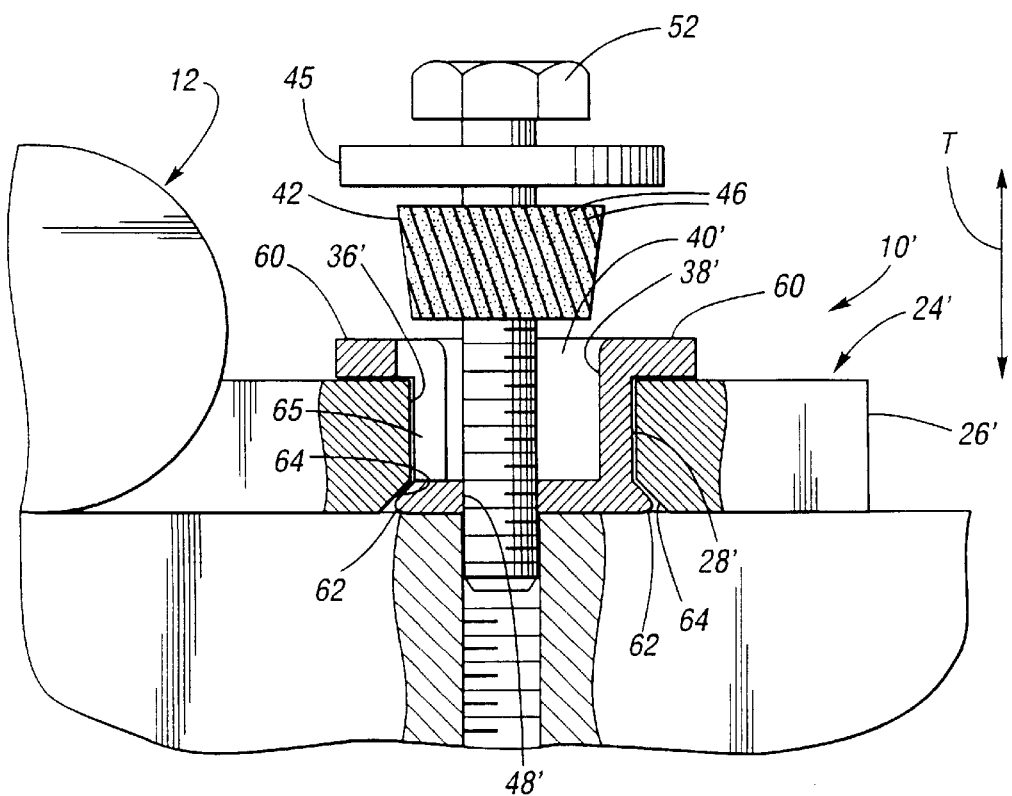
FIG. 4 is a partly sectional side view of the second form the two-component bracket and drive washer combination, shown at a preliminary stage of operation.

Referring now to the Drawings, FIGS. 1 and 2 generally depict a first form of the two-component bracket and drive washer combination 10 according to the present invention in an exemplar environment of operation, wherein the two-component bracket and drive washer combination serves to locate a magnetic sensor 12 with respect to a reluctor 14. In this regard, the magnetic sensor 12 has a sensor body 16 which includes a sensor tip 18. The sensor tip 18 extends into a sensor port 20 of an engine block 22 and is spaced from the reluctor 14 a predetermined distance equal to an optimum air gap G which provides optimal sensing performance by the magnetic sensor of magnetic field variations as the reluctor spins.

A two-component bracket 24 is composed of a main bracket component 26 and a reaction bracket component 28. The main bracket component 26 is connected to the sensor body 16, as for example in perpendicular relation analogous to a flag on a flag pole. The main and reaction bracket components 26, 28 are located in side-by-side relation to each other and interconnected therebetween so as to be slidable in relation to each other along a longitudinal axis. The interconnection is achieved, for example, via elongate holes 30 in the main bracket component 26 which receive therethrough bent over tabs 32 of the reaction bracket component 28, wherein the holes 30 are elongated along a longitudinal axis L.

The main bracket component 26 is provided with a relatively large aperture 34, wherein a drive wall 36 of the main bracket component is located on one side thereof. The reaction bracket component 28 has a reaction wall 38 located in the aperture 34 opposite the drive wall 36. The drive and reaction walls 36, 38 are oriented parallel to the longitudinal axis L, and mutually result in a collective opening 40 that is elongated along the longitudinal axis.

A drive washer 42 has a knurled sidewall 44, the knurling of which provides a plurality of teeth 46 having a predetermined pitch angle A (see FIG. 2). The teeth 46 of the sidewall 44 may be provided in any suitable form, such as for example splines, serrations, cutting ridges or cutting surfaces arranged along the pitch angle. A slight draft (ie., conical shape) of the drive washer 42 is preferred to facilitate initial insertion of the drive washer into the collective opening 40 with respect to abutment with the drive and reaction walls 36, 38.

The drive washer 42 and spacing between the drive and reaction walls 36, 38 are dimensioned so that when the drive washer is inserted into the collective opening 40, the drive and reaction walls tightly abut the teeth 46 of the drive washer. Since the teeth 46 are hard in relation to the drive and reaction walls 36, 38, the teeth inscribe corresponding grooves into the smooth drive and reaction walls as the drive washer is pressed into the collective opening 40 along a transverse axis T. In this regard, it is preferred for the drive wall 36 to be softer than the reaction wall 38; for example, the drive wall may be composed of plastic while the driven wall may be composed of metal. Preferably, the drive washer 42 is composed of a hard metal.

The reaction bracket component 38 has an affixment hole 48 generally centrally positioned with respect to the aperture 34 and is secured to a non-movable article, such as for example a mounting surface 50 of the engine block 22, via a bolt 52 passing through the affixment hole and threading into a threaded bore 54 at the mounting surface. The drive washer 42 has a central hole 56 through which the bolt 52 also passes. A flat disk washer 45 is preferably located between the head of the bolt 52 and the drive washer 42.

Both the main bracket component 26 and the reaction bracket component 28 are restrained from rotating about the bolt 52 via the sensor body 16 being received into the sensor port 20; however, the drive washer 42 is freely rotatable about the bolt. The main bracket component 26 is freely movable along the longitudinal axis L, but is restrained from moving along the transverse axis T by tightening action of the bolt. The reaction bracket component is restrained from moving along both the longitudinal and transverse axes L. T by virtue of the bolt having a generally snug fit with respect to the affixment hole 48 and the tightening of the bolt.

In operation, an installer places the sensor body 16 into the sensor port 20 such that the sensor tip 18 touches the surface of the reluctor 14. The bolt 52 carrying the drive washer 42 is loosely threaded into the threaded bore 54 of the mounting surface until the teeth of the sidewall of the drive washer touch the drive and reaction walls 36, 38. The installer continues to thread the bolt 52 into the threaded bore 54, thereby causing the drive washer 42 to be pressed into the collective opening 40 along the transverse axis T.

Referring now more particularly to FIG. 2, as the bolt 52 is tightened, the teeth 46 of the drive washer 42 engage the smooth drive and reaction walls 36, 38, whereupon corresponding grooves 58 are inscribed thereinto. In this regard, as the drive washer 42 moves into the collective opening 40, the drive washer rotates on the bolt 52 in response to the pitch angle A of the teeth 46 as the teeth cut into the reaction wall 38. Further in this regard, the drive wall 36 is caused to move along the pitch angle A of the teeth 46 and further to move in response to the rotation of the drive washer. Accordingly, as the drive washer 42 moves along the transverse axis T, the main bracket component 26 moves along the longitudinal axis L in relation to the bolt 52 at twice the rate as that provided by the pitch angle alone. The distance of relative movement of the main bracket component 26 along the longitudinal axis L to provide the air gap, G, is determined by the depth of penetration of the drive washer 42 into the collective opening 40 along the transverse axis T and the pitch angle A of the teeth 46, as will be discussed in greater detail hereinbelow.

Referring now to FIGS. 3 through 8 the second form of the two-component bracket and drive washer combination 10', which is most preferred, will be detailed. For the sake of brevity, same numerals will designate same parts and primed numerals will designate analogous parts to those parts designated by numerals in FIGS. 1 and 2, so that a fully repetitive description is obviated for a full understanding thereof.

The two-component bracket 24' is composed of a main bracket component 26' and a reaction bracket component 28' and the main bracket component is connected to the sensor body 16. The main and reaction bracket components 26', 28' are interconnected by upper and lower overhangs 60, 62 which interferingly engage the main bracket component 26' with respect to the transverse axis T, yet allow slidable movement along the longitudinal axis L. A chamfer 64 of the main bracket component 26' is preferably provided for interfacing with the lower overhang 62.

The reaction wall 38' is formed at one side of the aperture 34', wherein the drive wall 36' is located on the other side thereof by virtue of a cut-away section 65 of the reaction bracket component 28'. The drive and reaction walls 36', 38' are oriented parallel to the longitudinal axis L, and mutually result in the collective opening 40'.

The drive washer 42 is as described hereinabove. The drive washer 42 and spacing between the drive and reaction walls 36', 38' are dimensioned so that when the drive washer is inserted into the collective opening 40', the drive and reaction walls tightly abut the teeth 46 of the drive washer. Since the teeth 46 are hard in relation to the drive and reaction walls 36', 38', the teeth inscribe corresponding grooves into the smooth drive and reaction walls as the drive washer is pressed into the collective opening along a transverse axis T, as described hereinabove; and the hardness relationships are as previously described.

The affixment hole 48' in the reaction bracket component 38' receives the bolt 52, as previously described. Both the main bracket component 26' and the reaction bracket component 28' are restrained from rotating about the bolt 52 via the sensor body 16 being received into the sensor port 20 (see FIG. 5); however, the drive washer 42 is freely rotatable about the bolt. The main bracket component 26' is freely movable along the longitudinal axis L, but is restrained from moving along the transverse axis T by tightening action of the bolt. The reaction bracket component 28' is restrained from moving along both the longitudinal and transverse axes L, T by virtue of the bolt having a generally snug fit with respect to the affixment hole 48 and the tightening of the bolt.

Referring now to FIGS. 5 through 8, operation will be described with respect to setting an air gap.

Figure 5:
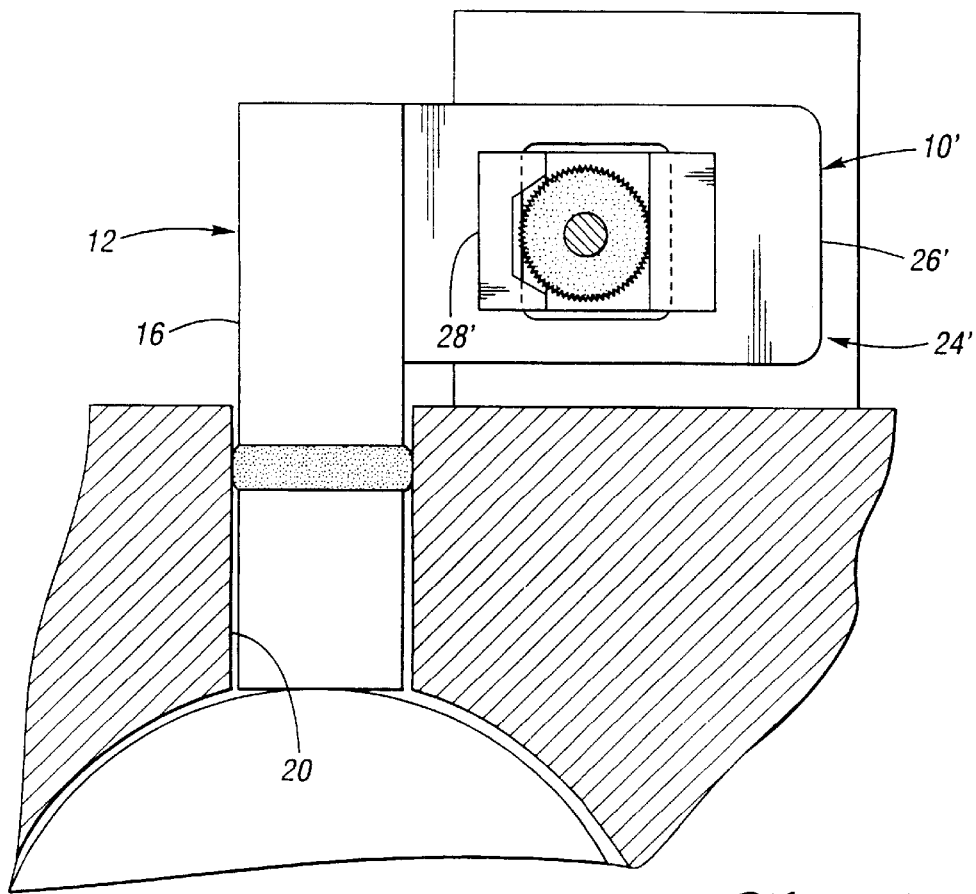
FIG. 5 is a partly sectional top plan view of the second form of the two-component bracket and drive washer combination, now shown at an initial stage of operation thereof.
Figure 6:
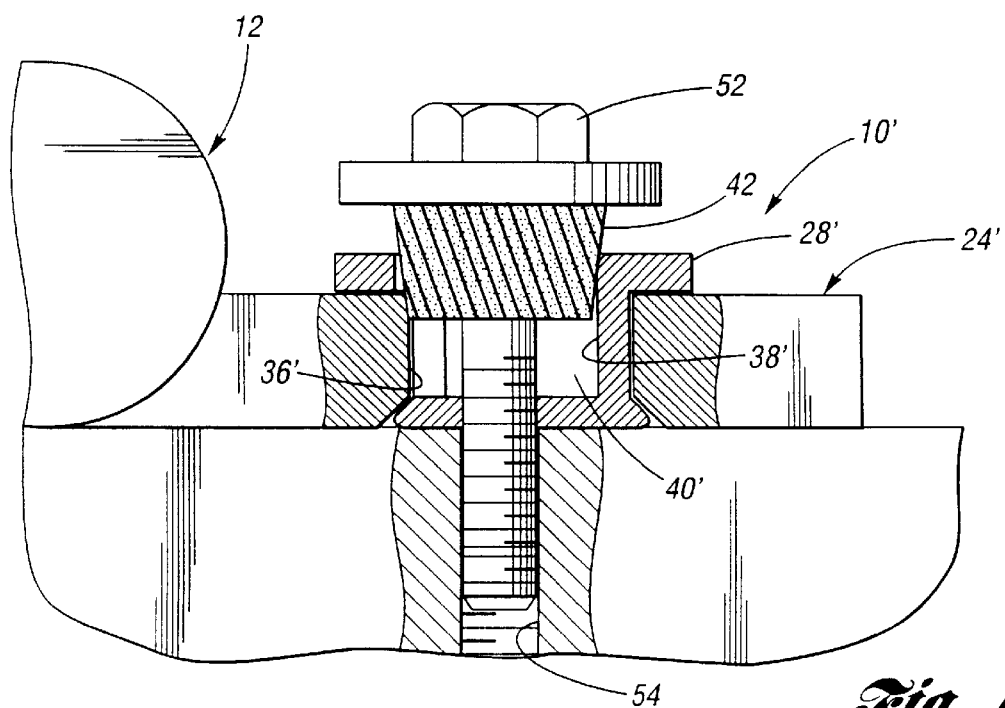
FIG. 6 is a partly sectional side view of the second form of the two-component bracket and drive washer combination, shown at the initial stage of operation.
Figure 7:
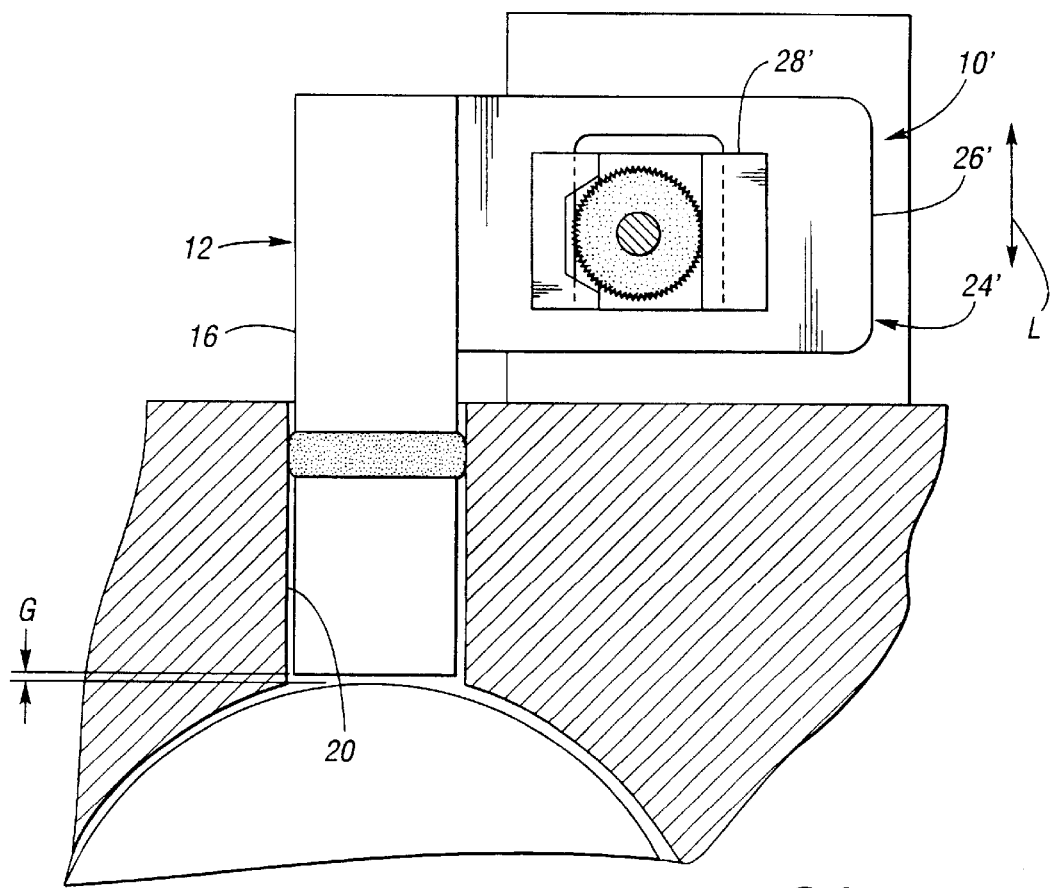
FIG. 7 is a partly sectional top plan view of the second form of the two-component bracket and drive washer combination, now shown at a final stage of operation thereof.

As shown at FIG. 5, an installer places the sensor body 16 into the sensor port 20 such that the sensor tip 18 touches the surface of the reluctor 14. As shown at FIG. 6, the bolt 52 carrying the drive washer 42 is loosely threaded into the threaded bore 54 of the mounting surface until the sidewall of the drive washer 42 touches the drive and reaction walls 36', 38'. The installer continues to thread the bolt 52 into the threaded bore 54, thereby causing the drive washer 42 to be pressed into the collective opening 40' along the transverse axis T.

Figure 8:
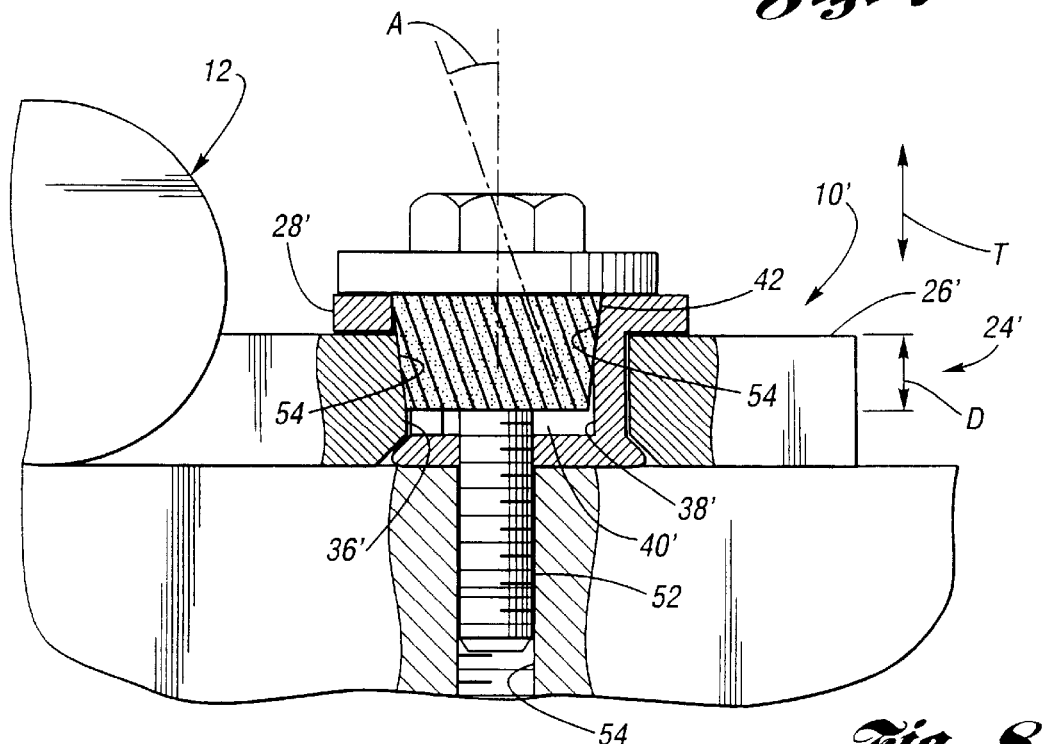
FIG. 8 is a partly sectional side view of the second form of the two-component bracket and drive washer combination, shown at the final stage of operation.

As shown comparatively by reference to FIGS. 6 and 8, as the bolt 52 is tightened, the teeth 46 of the drive washer 42 engage the smooth drive and reaction walls 36', 38', whereupon corresponding grooves 58 are inscribed thereinto. In this regard, as the drive washer 42 moves into the collective opening 40', the drive washer rotates on the bolt 52 in response to the pitch angle A of the teeth 46 as the teeth cut into the reaction wall 38'. Further in this regard, the drive wall 36' is caused to move along the pitch angle A of the teeth 46 and further to move in response to the rotation of the drive washer. Accordingly, as the drive washer 42 moves along the transverse axis T, the main bracket component 26' moves along the longitudinal axis L in relation to the bolt 52 at twice the rate as that provided by the pitch angle alone. As shown by comparison between FIGS. 5 and 6 and FIGS. 7 and 8, the distance of relative movement of the main bracket component 26' along the longitudinal axis L is given by: $2*(D*\tan(A))=G$, wherein D is the depth of penetration of the drive washer 42 into the collective opening 40' along the transverse axis T, A is the pitch angle of the teeth 46, and G is the distance of movement of the main bracket component along the longitudinal axis L.

Now, should the magnetic sensor require servicing, it can be removed and re-installed, or a new magnetic sensor can be installed in its place, using the installation procedure outlined above. In each case, the optimum air gap will be precisely achieved automatically. In the case of re-installation, the original installation will have resulted in the drive washer and two-component bracket becoming lodged together so as to resist mutual separation. Consequently, the magnetic sensor can be re-installed using the lodged drive washer and two-component bracket combination and yet the same air gap will pertain because the original relative position between the mounting bolt and the two-component bracket will be maintained.

It should be noted that by the term "smooth" as used herein is meant that the surface is able to accept inscribing by the teeth as described hereinabove, whether or not the surface is actually physically smooth. Indeed, it is sufficient for the teeth of the drive washer to engage the drive and reaction walls. By "engage" is meant the teeth of the drive washer inscribe the drive and reaction walls or follow wall teeth already present on the drive and reaction walls.

To those skilled in the art to which this invention appertains, the above described preferred embodiments may be subject to change or modification. Such change or modification can be carried out without departing from the scope of the invention, which is intended to be limited only by the scope of the appended claims.

What is claimed:

1. A method for precisely spacing one article from another article, said method comprising the steps of:

providing an aperture in a first article, the first article having a drive wall at one side of the aperture;

providing a second article having a reaction wall located in the aperture opposite the drive wall; touching a preselected surface of the first article to a third article;

restraining the second article from moving relative to the third article:

providing a fourth article having teeth oriented at a predetermined pitch angle: and moving the fourth article along a transverse axis between the drive and reaction walls, whereupon the teeth tightly abut said drive and reaction walls;

wherein said step of moving results in the drive and reaction walls being engaged by the teeth such that the first article is caused to move relative to the second article; and wherein said step of moving results in the first article moving along a longitudinal axis which is perpendicular to the transverse axis a predetermined distance such that the preselected surface is precisely spaced from the third article.

* * * * *